United States Patent
Nakano (10) Patent No.: US 7,610,436 B2
(45) Date of Patent: Oct. 27, 2009

(54) SEMICONDUCTOR DEVICE HAVING FLASH MEMORY WITH A DATA LENGTH TABLE

(75) Inventor: Masataka Nakano, Kanagawa (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 456 days.

(21) Appl. No.: 11/377,434

(22) Filed: Mar. 17, 2006

(65) Prior Publication Data

US 2006/0212646 A1 Sep. 21, 2006

(30) Foreign Application Priority Data

Mar. 18, 2005 (JP) ............................. 2005-080453

(51) Int. Cl.
*G06F 12/00* (2006.01)

(52) U.S. Cl. ...................... 711/103; 711/156; 711/170; 711/173

(58) Field of Classification Search ...................... None
See application file for complete search history.

(56) References Cited

U.S. PATENT DOCUMENTS 6,839,823 B1 * 1/2005 See et al. .................... 711/171
7,054,195 B2 * 5/2006 Matsunaga ............. 365/185.11

FOREIGN PATENT DOCUMENTS

JP 2002-334024 11/2002

* cited by examiner

*Primary Examiner*—Reginald G Bragdon
*Assistant Examiner*—Shawn X Gu
(74) *Attorney, Agent, or Firm*—McGinn IP Law Group, PLLC (57) ABSTRACT

A semiconductor device includes a flash memory having a plurality of blocks; a controller configured to be accessible to the flash memory; and a data length table configured to store an identifier indicating a kind of each of a plurality of data and a data length of the data. A specific block as one of the plurality of blocks stores the plurality of data and identifiers for the plurality of data. The specific block may have a plurality of continuous sections, and each of the plurality of sections may store one of the plurality of data and one of the identifiers for the data.

14 Claims, 6 Drawing Sheets

SEMICONDUCTOR DEVICE HAVING FLASH MEMORY WITH A DATA LENGTH TABLE

BACKGROUND OF THE INVENTION

1. Field of the Invention

The present invention relates to a semiconductor device, and more particularly relates to a semiconductor device having a flash memory.

2. Description of the Related Art

In recent years, a semiconductor device in which both of a flash memory and EEPROM (Electrically Erasable Programmable Read Only Memory) are installed is often used, as disclosed in Japanese Laid Open Patent Application (JP-P2002-334024A). In such a semiconductor device, the flash memory and the EEPROM are used independently based on data to be stored. This is because when data is written into the flash memory, any data cannot be written unless the stored data is erased in units of blocks.

However, the configuration in which both of the flash memory and the EEPROM are installed in an electronic apparatus results in a great demerit from the viewpoint of the cost. Thus, a technique for treating the flash memory as the EEPROM is demanded.

SUMMARY OF THE INVENTION

In an aspect of the present invention, a semiconductor device includes a flash memory having a plurality of blocks; a controller configured to be accessible to the flash memory; and a data length table configured to store an identifier indicating a kind of each of a plurality of data and a data length of the data. A specific block as one of the plurality of blocks stores the plurality of data and identifiers for the plurality of data.

Here, the data length table may be stored in another of the plurality of blocks.

Also, the specific block may have a plurality of continuous sections, and each of the plurality of sections may store one of the plurality of data and one of the identifiers for the data.

In each of the plurality of sections, the identifier may be stored in a head address and the data is stored in a subsequent address region to the head address.

Also, the controller may find out a free area in the specific block by sequentially tracing the identifier in each of the plurality of sections while referring to the data length table.

In this case, when accessing the specific block, the controller may carry out a skip process. In the skip process, the controller may sequentially trace the plurality of sections based on the identifier and the data length corresponding to the identifier.

Also, when a new data should be written in the specific block, the controller may find out a free area in the specific block, and forms a new section by writing the identifier corresponding to the new data and the new data in the found free area.

Also, when a latest data of a specific kind should be read out, the controller may sequentially trace the plurality of sections while holding or updating an address of the identifier in the traced section as a target address when the identifier in the traced section is coincident with an identifier for the specific kind, and read out the latest data from the held target address.

Also, an erasing operation may be carried out to the flash memory in units of the blocks.

Also, when the specific block is full, the controller may copy the latest data for each of all the kinds into another block, and may carry out an erasing operation to the specific block.

Also, the flash memory and the controller are formed in a micro computer chip.

In another aspect of the present invention, a method of using a flash memory as an EEPROM, is achieved by finding out a free area in a specific one of a plurality of blocks, the specific block including a plurality of sections arranged continuously and the free area; and by forming a new section in the specific block by writing a new data in the new section.

Here, the finding may be achieved by reading an identifier in one of the plurality of sections; by referring to a data length table configured to store the identifier indicating a kind of each of a plurality of data to be stored in the specific block and a data length of the data, to determine an address of a next section based on an address of the identifier of the one section and the data length of the data in the one section; and by repeating the reading an identifier and the referring from a head one of the plurality of sections to the free area.

Also, the forming may be achieved by writing the identifier of the new data in a head address of the new section and the new data in a subsequent address region of the new section.

Also, the method may be achieved by further copying the latest data of every kind into another block when the specific block is full; and carrying out an erase operation to the specific block.

Also, the method may be achieved by further preparing a storage area for a target address when the latest data of a specific kind should be read out; reading an identifier in one of the plurality of sections; checking whether the read identifier is coincident with an identifier of the specific kind; updating the target address based on an address of the read identifier when the read identifier is coincident with the identifier of the specific kind; referring to a data length table configured to store the identifier indicating a kind of each of a plurality of data to be stored in the specific block and a data length of the data, to determine an address of a next section based on an address of the identifier of the one section and the data length of the data in the one section; repeating the reading an identifier, the updating and the referring from a head one of the plurality of sections to the free area; and reading the latest data based on the updated target address.

DESCRIPTION OF THE PREFERRED EMBODIMENTS

Hereinafter, a semiconductor device according to the present invention will be described in detail with reference to the attached drawings.

Figure 1:
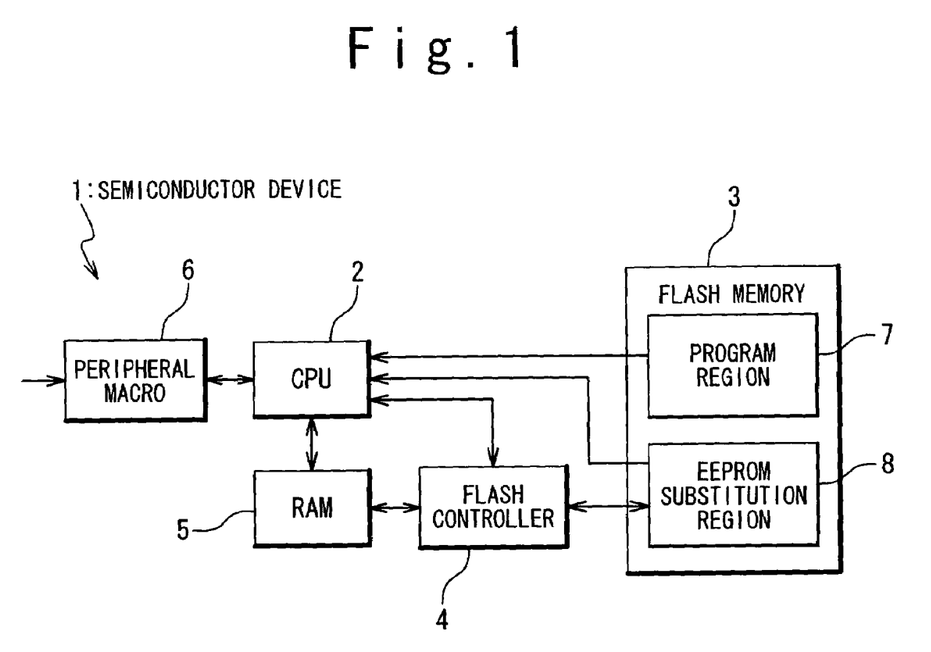
FIG. 1 is a block diagram showing a configuration of a semiconductor device according to the present invention.

FIG. 1 is a block diagram showing the configuration of a micro computer as the semiconductor device according to the present invention. The micro computer 1 as the semiconductor device includes a CPU 2, a flash memory 3, a flash controller 4, a RAM 5 and a peripheral macro 6. The flash controller 4 controls a read operation from and a write operation to the flash memory 3. The CPU 2 can access the RAM 5 and the peripheral macro 6, and can also access through the flash controller 4 to the flash memory 3. A user program is executed by the CPU 2. The flash memory 3 has an EEPROM substitution region 8, in addition to a program region 7 in which various data and programs are stored. According to the present invention, this EEPROM substitution region 8 is used as a substitution of the EEPROM.

Figure 2:
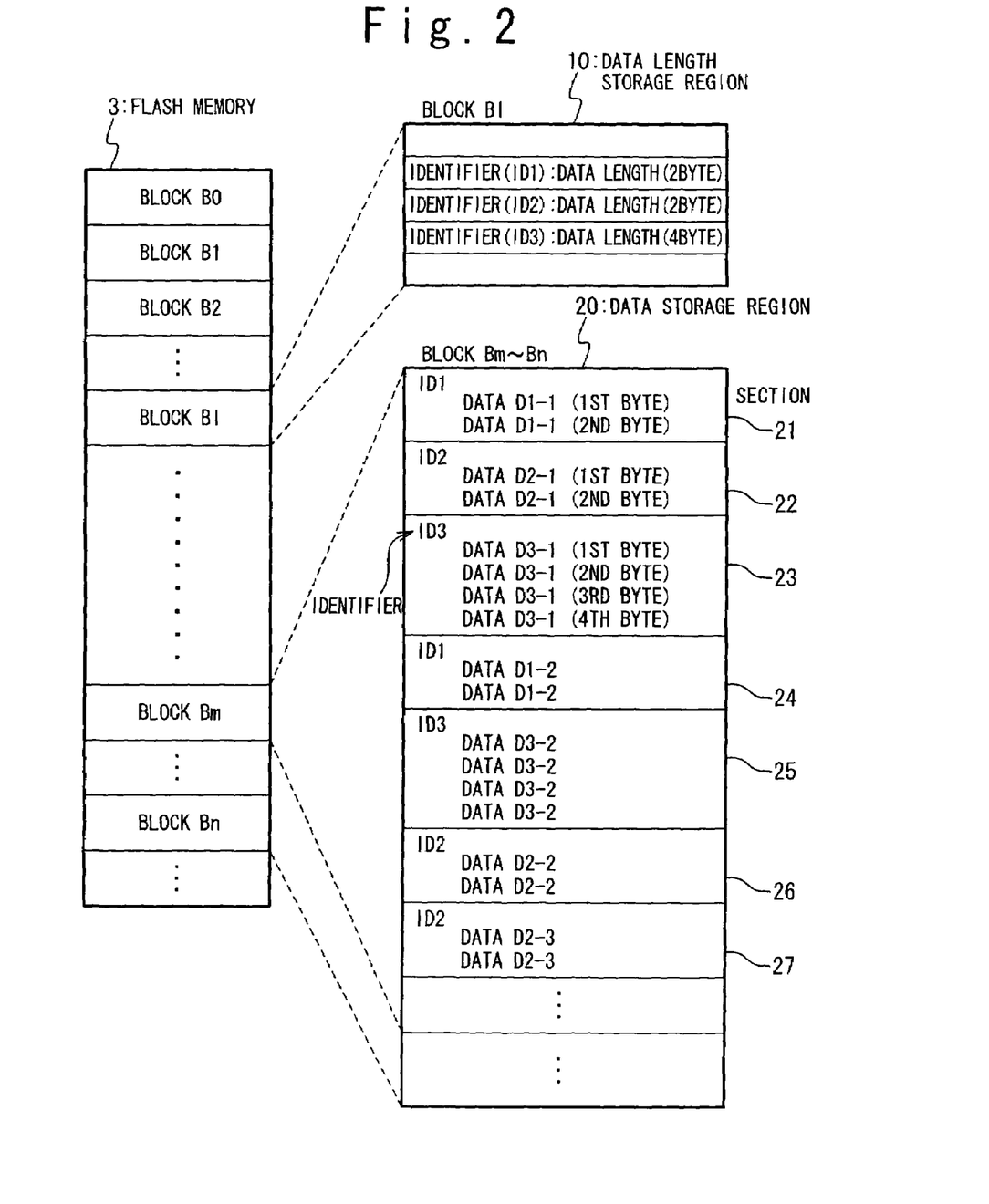
FIG. 2 is a conceptual diagram showing a configuration of a flash memory installed in the semiconductor device according to the present invention.

FIG. 2 is a conceptual diagram showing the configuration of the flash memory 3 installed in the semiconductor device 1 according to the present invention. As shown in FIG. 2, the flash memory 3 has a plurality of blocks B0, B1, B2 and so on. In the flash memory 3, each block serves as an erasure unit. Several blocks of the plurality of blocks are used as the EEPROM substitution regions 8 according to the present invention. Specifically, the EEPROM substitution region 8 is provided with a data length storage region 10 and a data storage region 20.

As the data length storage region 10, at least one block is used of the plurality of blocks B0, B1 and so on. For example, in FIG. 2, the block B1 is used as the data length storage region 10. In the present invention, it is supposed that a plurality of kinds of data are used in a plurality of user programs, respectively. The block B1 serving as the data length storage region 10 stores a set of an identifier of a kind and data length of each data to be stored. In short, the block B1 collectively manages the sets of the identifier and data length of the plurality of kinds of data. This identifier is an ID to identify the kind of the data.

In the following description, for simplicity, it is assumed that three kinds of data D1 to D3 are used. It is assumed that identifiers ID1 to ID3 are used to identify the data D1 to D3 respectively. Also, the data lengths of the three kinds of the data D1 to D3 are assumed to be 2 bytes, 2 bytes and 4 bytes, respectively. At this time, as shown in FIG. 2, the identifier (ID1) of the data D1 and the data length (2 bytes) of the data D1 are related to each other and stored in the block B1 serving as the data length storage region 10. Also, the identifier (ID2) of the data D2 and the data length (2 bytes) of the data D2 are related to each other and stored in the block B1. Moreover, the identifier (ID3) of the data D3 and the data length (4 bytes) of the data D3 are related to each other and stored in the block B1.

Also, as the data storage region 20, at least one block is used of the plurality of blocks B0, B1 and so on. For example, in FIG. 2, blocks Bm to Bn are used as the data storage region 20. The respective blocks in the data storage region 20 are used to store the plurality of data. Here, each block stores the plurality of data together with the identifiers.

As an example, FIG. 2 shows the content of the block Bm. This block Bm can be divided into a plurality of sections (21 to 27 and so on). Each section stores one data and the identifier corresponding to the data. For example, the section 21 stores the identifier ID1 of the data D1 together with a data D-1 of 2 bytes. The section 22 stores the identifier ID2 of the data D2 together with a data D2-1 of 2 bytes. The section 23 stores the identifier ID3 of the data D3 together with a data D3-1 of 4 bytes. The section 24 stores the identifier ID1 of the data D1 together with a data D1-2 of 2 bytes. The section 25 stores the identifier ID3 of the data D3 together with a data D3-2 of 4 bytes. The section 26 stores the identifier ID2 of the data D2 together with a data D2-2 of 2 bytes. And, the section 27 stores the identifier ID2 of the data D2 together with a data D2-3 of 2 bytes.

The plurality of sections 21 to 27 are arranged in turn from the head address of the block Bm. That is, the block Bm has the plurality of continuous sections, and each of the plurality of sections stores one data (D) and the identifier (ID) of the one data. Also, as shown in FIG. 2, in each section, the identifier (ID) is stored in the head address of the section. Preferably, one data (D) is stored in an address following the head address.

The data length storage region 10 and the data storage region 20 constitute the EEPROM substitution region 8 according to the present invention. As mentioned later, the use of the data length storage region 10 and the data storage region 20 permits the EEPROM substitution region 8 in the flash memory 3 to be treated as the EEPROM.

It should be noted that the CPU 2, the flash memory 3, the flash controller 4, the RAM 5 and the peripheral macro 6 shown in FIG. 1 may be constituted on one chip. In that case, the semiconductor device 1 is the micro computer.

Next, by the CPU 2 or flash controller 4 shown in FIG. 1, the write/read operation for the flash memory 3 (EEPROM substitution region 8) is carried out. At first, the write/read operations are schematically described with reference to FIG. 1.

In case of a write operation, a trigger is supplied from the user program or peripheral macro 6 set by the user program to the CPU 2. Thus, an external sensor value, a state of the peripheral macro 6 and the like are stored in a predetermined region in the RAM 5. Subsequently, a firmware or user program is used to search the EEPROM substitution region 8 for a proper location for data to be written. Then, the flash controller 4 is used to write data stored in a predetermined region of the RAM 5 into the proper portion of the EEPROM substitution region 8 in the flash memory 3. When the write of the data is completed, the flash controller 4 reports the completion of the write operation to the CPU 2.

In case of a read operation, a trigger is supplied from the user program, or the peripheral macro 6 set by the user program. Subsequently, the firmware or user program is used to search a portion where the newest data has been written, from the EEPROM substitution region 8. Then, the CPU 2 reads the necessary data from the EEPROM substitution region 8 in the flash memory 3.

The write operation and read operation according to the present invention will be described below.

(Write Operation)

Figure 3:
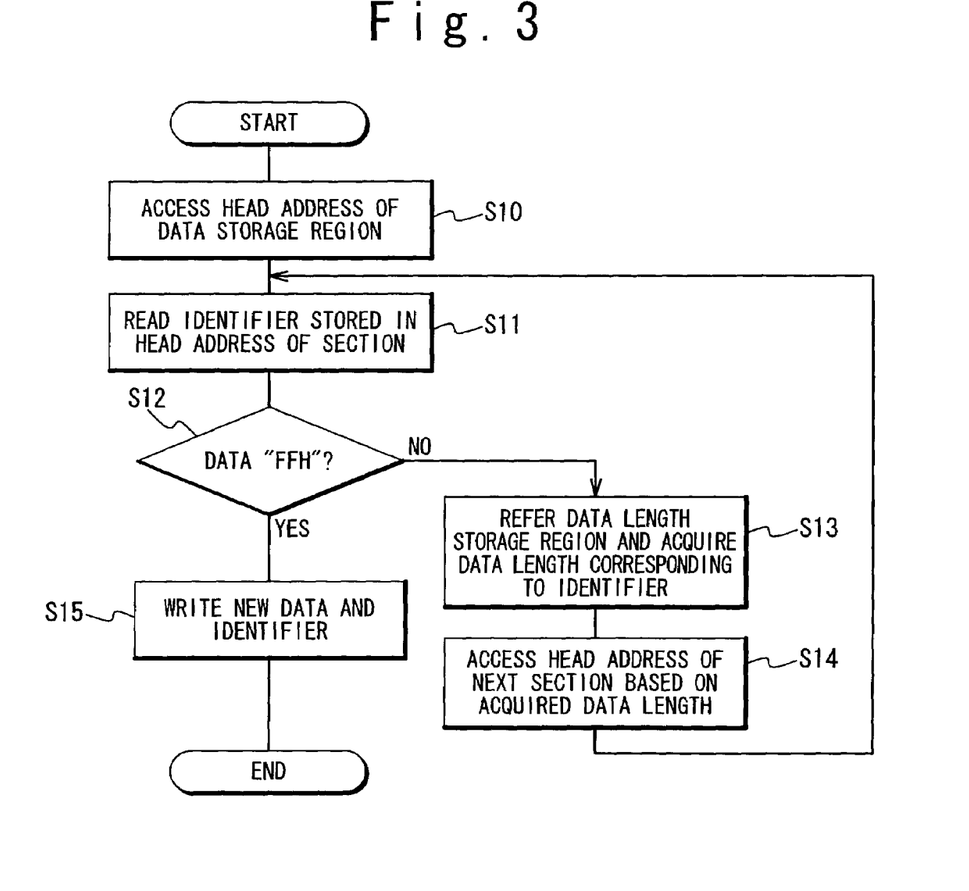
FIG. 3 is a flowchart showing a write operation in the semiconductor device according to the present invention.
Figure 4:
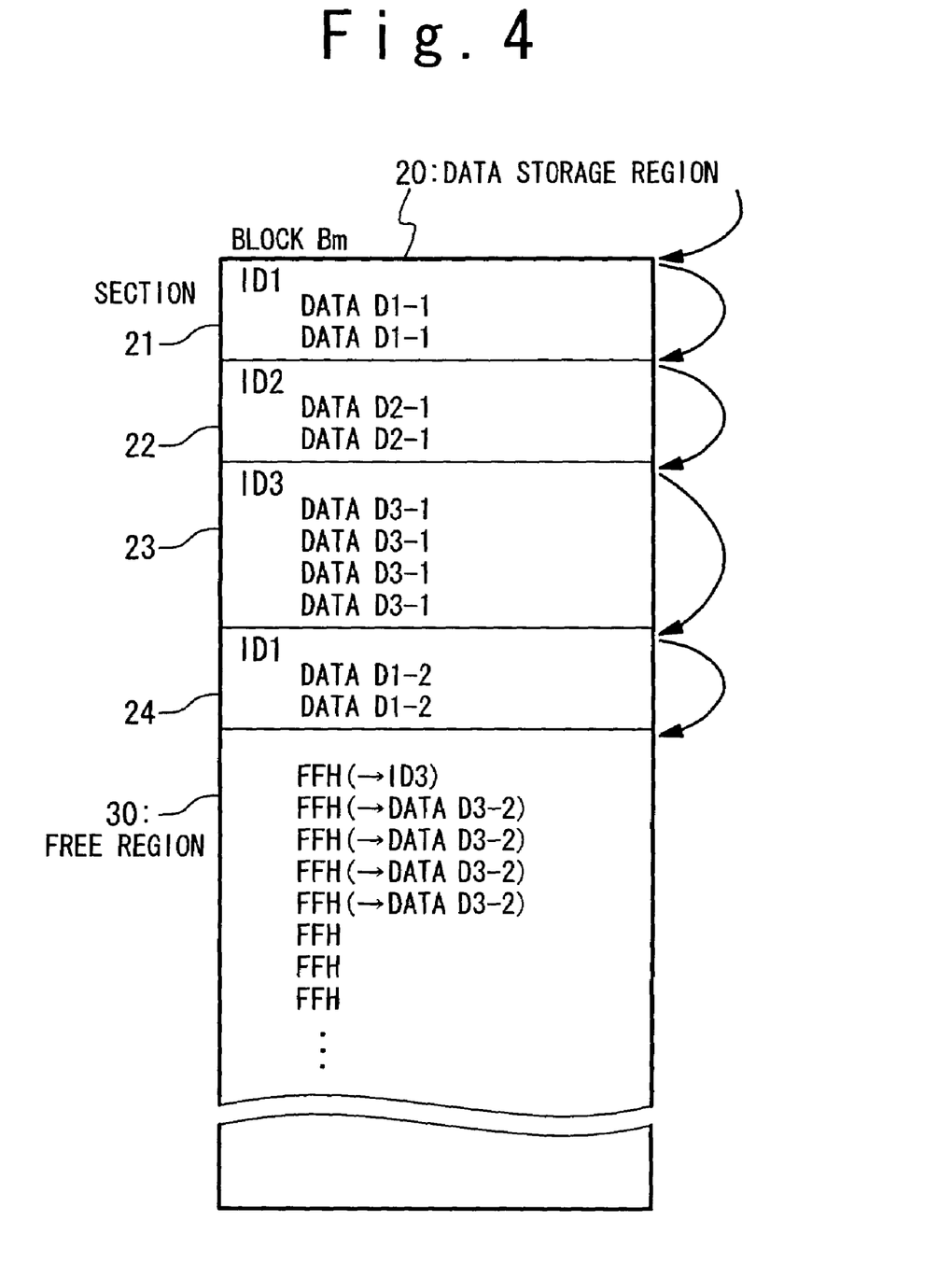
FIG. 4 is a diagram showing one example of the write operation in the semiconductor device according to the present invention.

FIG. 3 is a flowchart showing the write operation according to the present invention, and FIG. 4 shows one example of the write operation. In this embodiment, it is supposed that the sections 21 to 24 of the block Bm as the data storage region 20 already store the data D1-1, the data D2-1, the data D3-1 and the data D1-2, respectively. Also, it is supposed that data is not written to a region following the section 24. The region following the section 24 is referred to as a free region (non-written region) 30. A case that a new data D3-2 is written to the block Bm in the above state will be described.

At first, the CPU 2 or flash controller 4 (hereafter, referred to as the controller) accesses the head address of the block Bm, namely, the head address of the section 21 (Step S10). Then, the controller reads the identifier stored in the head address of the section 21 (Step S11). At this time, the data of the head address of the section 21 is not "1" ("FFH") indicating an erased state, but rather the identifier ID1 of the data D1 (Step S12; No).

Next, the controller refers to a data length table stored in the data length storage region 10 (refer to FIG. 2). Consequently, the controller obtains the data length (2 bytes) corresponding to the read identifier ID1 (Step S13). Subsequently, the controller accesses the head address of the next section 22, namely, the address three bytes ahead, in accordance with the obtained data length (2 bytes) (Step S14). In succession, the controller reads the identifier stored in the head address of the section 22 (Step S11). The data of the head address in the section 22 is the identifier ID2 of the data D2 (Step S12; No). Thus, the controller refers to the data length storage region 10 and obtains the data length (2 bytes) corresponding to the read identifier ID2 (Step S13). Then, the controller accesses the head address of the section 23 in accordance with the obtained data length (2 bytes) (Step S14).

Hereafter, the similar process is repeated. Those repeated steps S11 to S14 are referred to as [Skipping Proess]. The controller according to the present invention repeatedly executes the skipping process in accordance with the identifiers (ID) stored in the respective sections and the data lengths collectively managed in the data length storage region 10. Consequently, the access is sequentially performed on the head addresses of the sections 22, 23 and 24 from the head address of the block Bm.

The controller reads the data stored in the address three bytes ahead, next to the head address of the section 24 (Step S11). At this time, as shown in FIG. 4, the data of the address is "1" ("FFH") indicating the erased state (Step S12; Yes). Thus, the controller determines or recognizes that the address is the head address of the free region 30, and writes the new data D3-2 and the identifier ID3 of the new data D3-2 to the free region 30 (Step S15). Specifically, the controller writes the identifier ID3 to the head address of the free region 30 and writes the new data D3-2 (4 bytes) to the address following the head address.

In this way, the controller according to the present invention repeats [Skipping Process] and consequently retrieves the free region 30 where the data is erased in the data storage region 20. Then, the controller writes the new data and its identifier to the retrieved free region 30. Thus, the new section 25 is generated. If the block Bm is filled with the data, the controller writes the new data to another block (for example, a block Bn) in the data storage region 20. Also, the newest storage data is copied to the block Bn. A collective erasing operation is performed on the block Bm where the data is filled.

(Read Operation)

Figure 5:
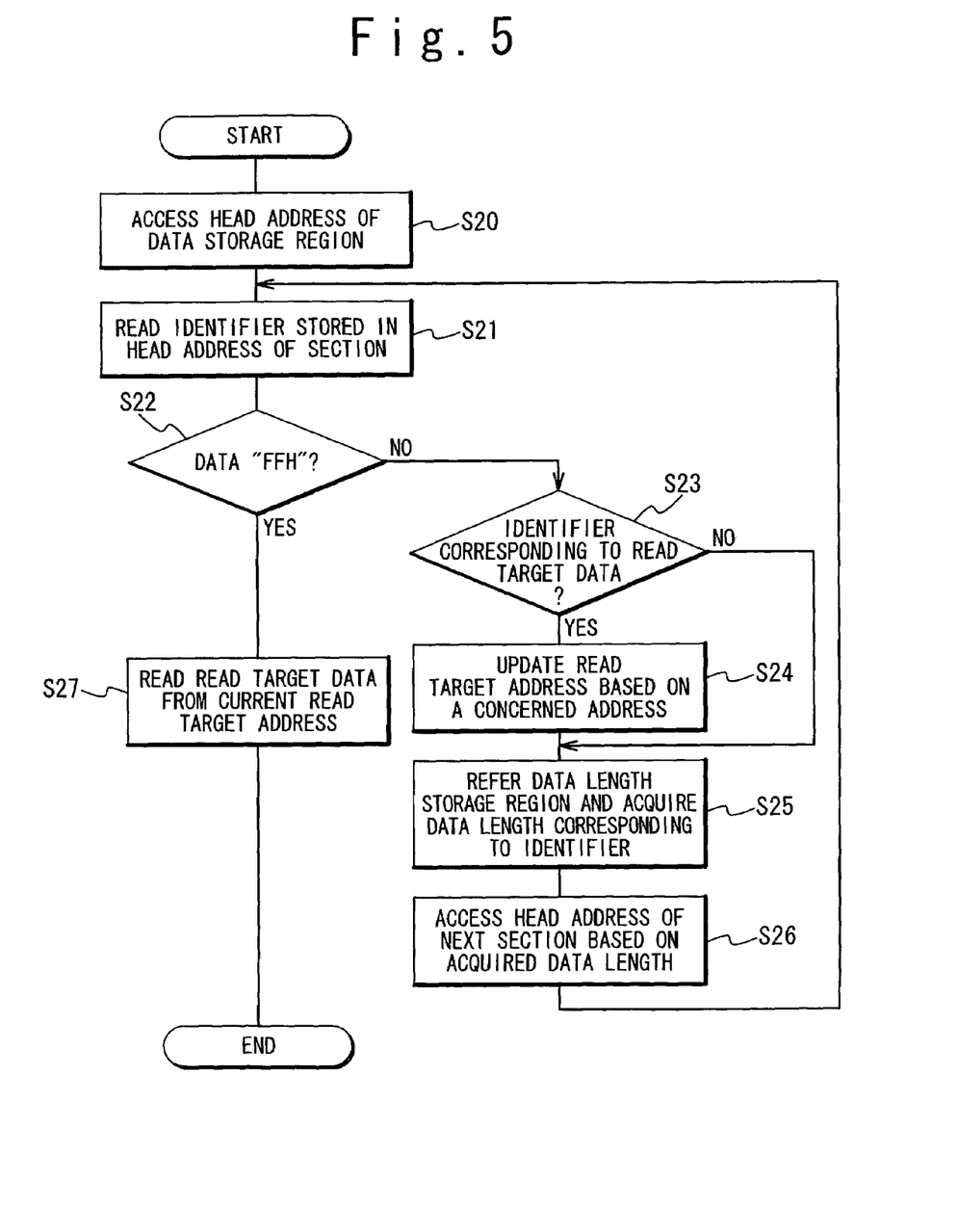
FIG. 5 is a flowchart showing a read operation in the semiconductor device according to the present invention.
Figure 6:
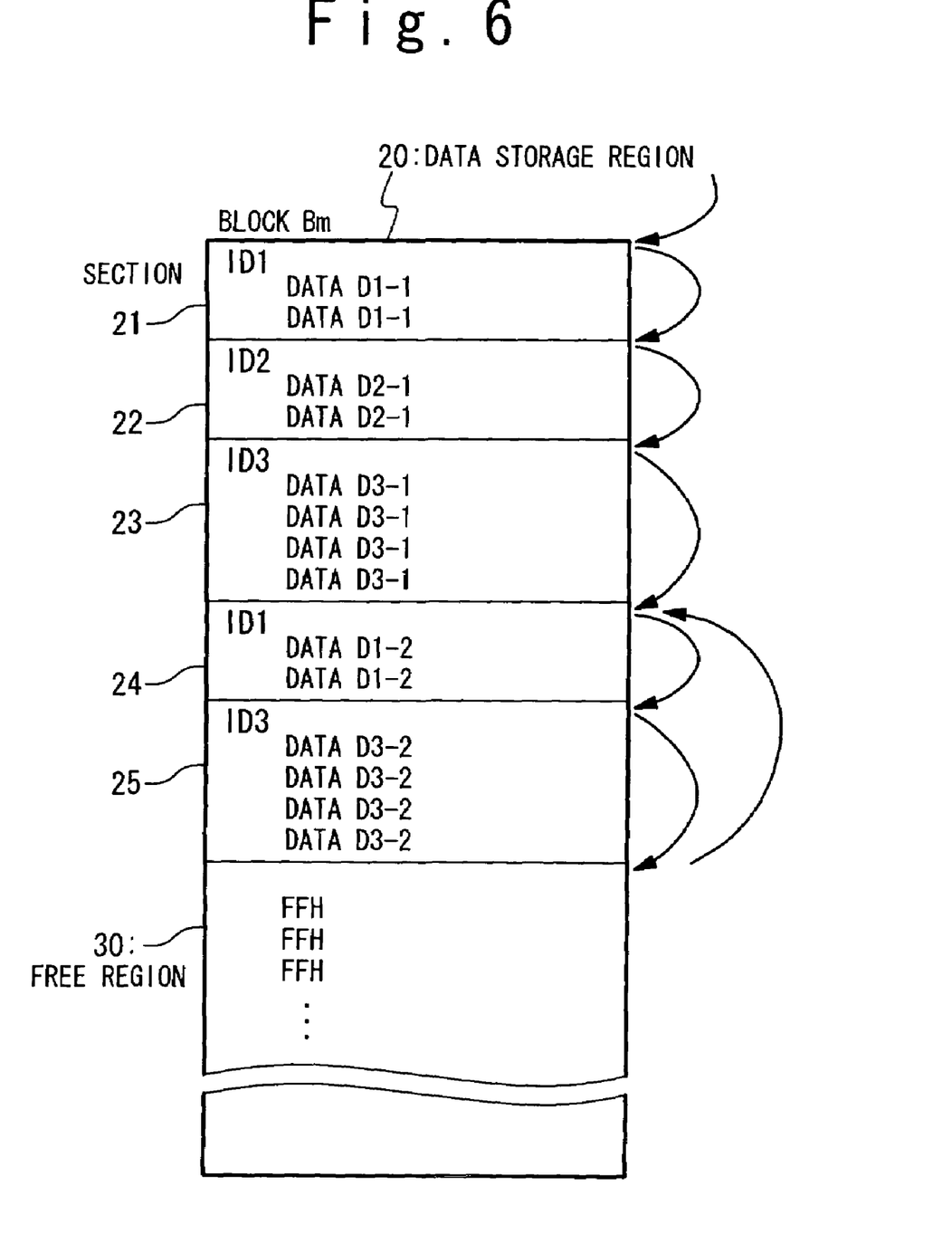
FIG. 6 is a diagram showing one example of the read operation in the reading operation according to the present invention.

FIG. 5 is a flowchart showing the read operation according to the present invention. Also, FIG. 6 shows one example of the read operation. In this embodiment, it is supposed that the sections 21 to 25 of the block Bm as the data storage region 20 already store the data D1-1, the data D2-1, the data D3-1, the data D1-2 and the data D3-2, respectively. Also, it is supposed that a region following the section 25 is the free region (non-written region) 30. It is supposed that a data D1 (read target data) among the plurality of kinds of data is read out from the block Bm in such a state.

At first, the controller accesses the head address of the block Bm, namely, the head address of the section 21 (Step S20). Then, the controller reads the identifier stored in the head address of the section 21 (Step S21). At this time, the data of the head address of the section 21 is not "1" ("FFH") indicating the erased state, but rather the identifier ID1 of the data D1 (Step S22; No).

Next, the controller determines whether or not the read-out identifier is the identifier corresponding to the read target data (Step S23). In this case, the read identifier is ID1, and the read target data is the data D1. Thus, the controller determines that the read identifier is the identifier of the read target data (Step S23; Yes). Then, the controller determines the head address of the section 21 as [Reading Target Data] and stores in the RAM 5 (Step S24).

Also, the controller refers to the data length table stored in the data length storage region 10 (refer to FIG. 2). Consequently, the controller obtains the data length (2 bytes) corresponding to the read-out identifier ID1 (Step S25). Subsequently, the controller accesses the head address of the next section 22 in accordance with the obtained data length (2 bytes) (Step S26).

In succession, the controller reads out the identifier stored in the head address of the section 22 (Step S21). The data of the head address of the section 22 is the identifier ID2 of the data D2 (Step S22; No). In this case, the read-out identifier ID2 is not the identifier of the read target data D1 (Step S23; No). Thus, the step S24 is not executed. The controller refers to the data length storage region 10 and obtains the data length (2 bytes) corresponding to the read identifier ID2 (Step S25). Then, the controller accesses the head address of the next section 23 in accordance with the obtained data length (2 bytes) (Step S26).

Hereafter, the similar process is repeated. Those repeated steps S21 to S25 are [Skipping Process] in the read operation. The controller according to the present invention repeatedly executes the skipping process in accordance with the identifiers (ID) stored in the respective sections and the data lengths collectively managed in the data length storage region 10. Each skipping process determines whether or not the read-out identifier is the identifier of the read target data D1 (Step S23). Consequently, the controller can recognize whether or not the section currently being accessed stores the read target data. For example, when the head address of the section 24 is accessed, the controller can recognize whether or not the section 24 stores the read target data D1, in accordance with the read identifier ID1. In this case, in accordance with the head address of the section 24, a read target address stored in the RAM 5 is updated (Step S24).

The controller reads the data stored in the address five bytes ahead, next to the head address of the section 25 (Step S21). At this time, as shown in FIG. 6, the data of the address is "1" ("FHH") indicating the erased state (Step S22; Yes). Thus, the controller determines (recognizes) that the address is the head address of the free region 30. At this time, the read target address held by the RAM 5 indicates the address where the newest data D1 (D1-2) is stored. Therefore, the controller refers to the read target address at the current time and reads the data D1-2, which is the newest read target data, from the section 24 (Step S27).

In this way, the controller according to the present invention repeats [Skipping Process] and consequently retrieves the free region 30 where the data is erased in the data storage region 20. Also, simultaneously with this skipping process, the controller refers to the read identifier and consequently updates the read target address. Thus, the controller can find out the section where the newest read target data is stored.

In case of the EEPROM, in order to treat the data of a certain user application, it is adequate to use only one section. In short, after the data is used in a certain section and is erased, the new data may be written into that section. However, in case of the flash memory, the erasure is carried out in units of blocks. Thus, it is not allowable to erase only the data stored in one section.

According to the present invention, instead of the configuration that the data stored in the certain section is rewritten, the new data is additionally written to the free region 30. Also, as mentioned above, in case of the read operation, the read target data written most immediately is read out. Here, the identifier (ID) stored together with the data for each section is effectively used. That is, by sequentially referring to the identifier stored for each section, it is possible to find out the read target data stored in the backmost address.

In this way, according to the present invention, the data is written or read for each application. In short, when it is viewed from outside the flash memory 3, the data seems to be updated for each application. Thus, according to the present invention, the flash memory 3 (the EEPROM substitution region 8) can be treated as the EEPROM.

Also, according to the present invention, the correspondence relation between the identifier and the data length is stored in the data length storage region 10. By referring to the data length corresponding to the identifier read from a certain section, the controller can quickly access a next section. That is, with [Skipping Process] based on the identifier, the accessing process to the data storage region 20 can be made faster.

Here, a method is considered which stores the identifier and the data length together with the data "for each section". However, according to this method, the size for each section is increased by the value corresponding to the information indicating the data length, and the information indicating the data length becomes redundant. According to the present invention, the data length storage region 10 "collectively" manages the correspondence relation between the identifier and the data length. Thus, the size for each section is contracted. Also, the redundancy of the information indicating the data length is removed. In this way, the flash memory 3 according to the present invention effectively uses the region in one block.

Since the region in one block is effectively used, the following effect can be further obtained. In the present invention, in order to treat the flash memory 3 as the EEPROM, the new data is additionally written to the free region 30. Thus, the contraction in the size for each section implies the increase in the number of the data writes until one block becomes full. The block filled with the data is again used after the execution of a collective erasure. Thus, when many write processes are executed, a certain block is repeatedly used. Here, the increase in the number of the writes until the certain block becomes full decreases the use frequency of the block when the number of the writes are executed. Since the use frequency is decreased, the life of a flash memory cell in the data storage region 20 is made longer. That is, according to the present invention, "Number of Writable Times" of the flash memory is increased.

Moreover, according to the present invention, the write is executed for each kind of data. For each data update, all of the kinds of data are not required to be written. Thus, the time when the data is written to the flash memory 3 is reduced. Also, as mentioned above, the size for each section is contracted over the case that the data length is stored for each session. Even with this contraction, the time when the data is written is reduced.

When the flash memory 3 according to the present invention is used, the reliability of the semiconductor device 1 is improved, and the usable application is also increased.

In the semiconductor device according to the present invention, the flash memory can be treated as the EEPROM.

In the semiconductor device according to the present invention, the number of the writable times of the flash memory is increased.

In the semiconductor device according to the present invention, the time when a data is written to the flash memory is reduced.

What is claimed is:

1. A semiconductor device, comprising:
    a flash memory having a plurality of blocks;
    a controller configured to be accessible to said flash memory; and
    a data length table configured to store an identifier that corresponds to a kind of data from a plurality of data, and a data length of said kind of data from the plurality of data,
    wherein a specific block from said plurality of blocks stores said plurality of data and the identifier that corresponds to the kind of data from the plurality of data,
    wherein the specific block comprises a plurality of sections,
    wherein, if a latest data of a specific kind should be read out, said controller sequentially traces said plurality of sections while holding or updating an address of an identifier that corresponds to a traced section as a target address,
    wherein said plurality of sections are continuous,
    wherein each of said plurality of sections stores said kind of data from the plurality of data and the identifier that corresponds to said kind of data from the plurality of data,
    wherein in each of said plurality of sections, said identifier that corresponds to said kind of data from the plurality of data is stored in a head address and said kind of data from the plurality of data is stored in a subsequent address region to said head address, wherein said controller finds out a free area in said specific block by sequentially tracing said identifier that corresponds to said kind of data from the plurality of data in each of said plurality of sections while referring to said data length table, and
    wherein the controller sequentially traces the plurality of sections if said identifier that corresponds to the traced section is coincident with an identifier for the specific kind, and reads out said latest data from the held or updated target address.

2. The semiconductor device according to claim 1, wherein said data length table is stored in another of said plurality of blocks.

3. The semiconductor device according to claim 1, wherein an erasing operation is carried out to said flash memory in units of said plurality of blocks.

4. The semiconductor device according to claim 1, wherein said flash memory and said controller are formed in a micro computer chip.

5. The semiconductor device according to claim 1,
    wherein, when accessing said specific block, said controller carries out a skip process, and
    wherein, in said skip process, said controller sequentially traces said plurality of sections based on said identifier that corresponds to said kind of data from the plurality of data and said data length corresponding to said identifier that of said kind of data from the plurality of data.

6. The semiconductor device according to claim 1, wherein, when a new data should be written in said specific block, said controller finds out a free area in said specific block, and forms a new section by writing an identifier corresponding to said new data and said new data in the found free area.

7. The semiconductor device according to claim 1, wherein, when said specific block is full, the controller copies latest data for each kind into another block, and carries out an erasing operation to said specific block.

8. A method of using a flash memory as an EEPROM, comprising: finding out a free area in a specific one of a plurality of blocks, said specific block including a plurality of sections arranged continuously and said free area;

forming a new section in said specific block by writing a new data in said new section;

preparing a storage area for a target address if a latest data of a specific kind should be read out;

reading an identifier in one of said plurality of sections;

checking if said read identifier is coincident with an identifier of said specific kind;

updating said target address based on an address of said read identifier if said read identifier is coincident with the identifier of said specific kind;

referring to a data length table configured to store said identifier of said specific kind indicating a kind of data from a plurality of data to be stored in said specific block and a data length of said kind of data from the plurality of data, to determine an address of a next section based on an address of said identifier of said one section and said data length in said kind of data from the plurality of data in said specific block;

repeating said reading, said updating and said referring from a head one of said plurality of sections to said free area; and  reading the latest data based on the updated target address.

9. The method according to claim 8, wherein said finding comprises:

reading an identifier in one of said plurality of sections;

referring to a data length table configured to store said read identifier that corresponds to the kind of data from the plurality of data to be stored in said specific block and the data length of said kind of data from the plurality of data, to determine an address of a next section based on an address of said read identifier that corresponds to the kind of data from the plurality of data in said one section and said data length of said kind of data from the plurality of data in said specific block; and  repeating said reading and said referring from a head one of said plurality of sections to said free area.

10. The method according to claim 8, wherein said forming comprises:

writing an identifier corresponding to said new data in a head address of said new section and said new data in a subsequent address region of said new section.

11. The method according to claim 8, further comprising:

copying latest data of every kind into another block when said specific block is full; and  carrying out an erase operation to said specific block.

12. The method according to claim 8, further comprising:

accessing a head address of a data storage region;

reading an identifier stored in the head address of the data storage region; and  reading a data stored in an address different from the head address,  wherein said forming is performed if it is determined that the read data is in an erased state.

13. The method according to claim 8, further comprising;

accessing a head address of a data storage region; and reading a data stored in an address different from the head address, wherein said forming is performed if it is determined that the address different from the head address comprises a head address of said free area.

14. The method according to claim 13, wherein said writing comprises writing said new data to an address following said head address of said free area.

\* \* \* \* \*